UNITED STATES PATENT OFFICE.

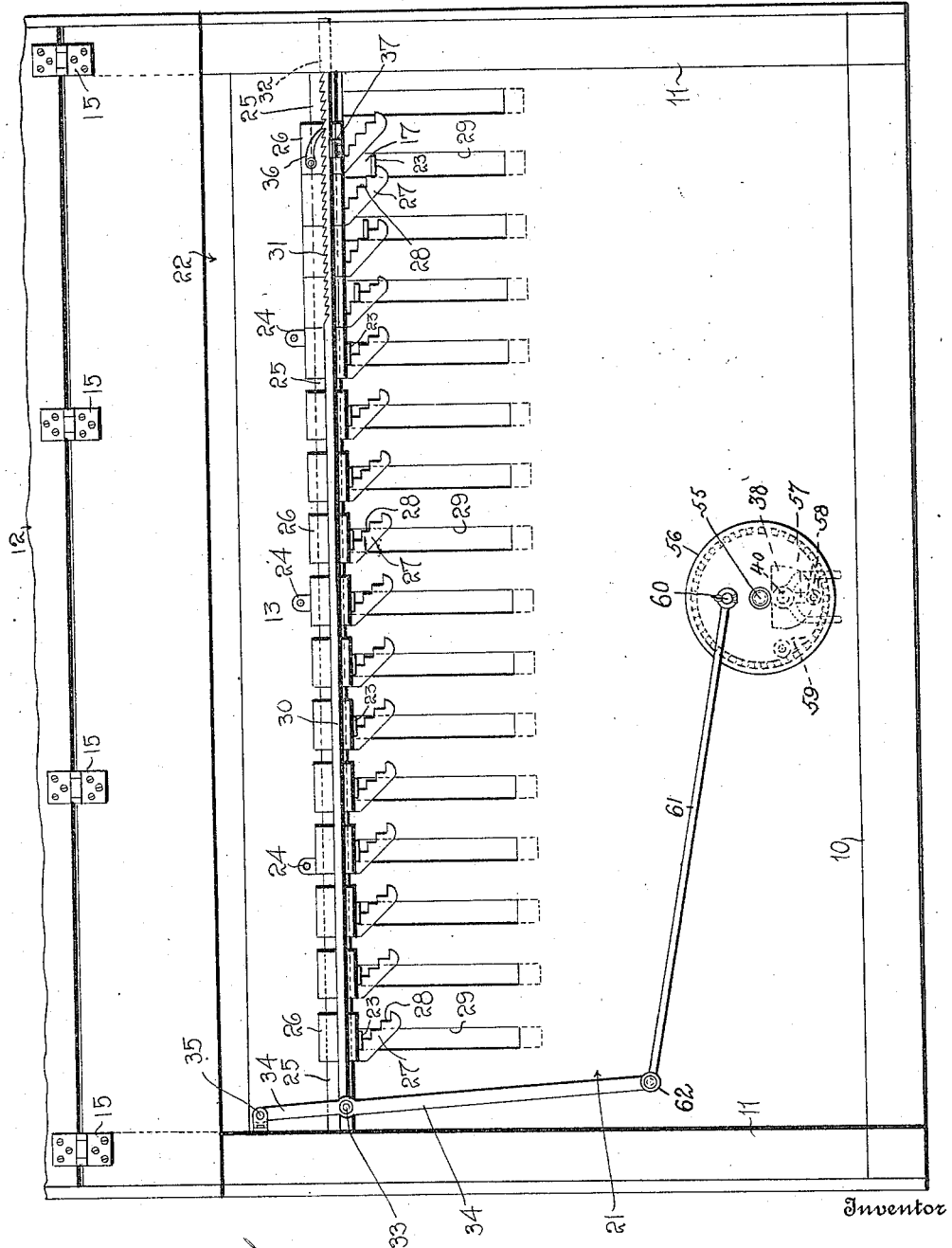

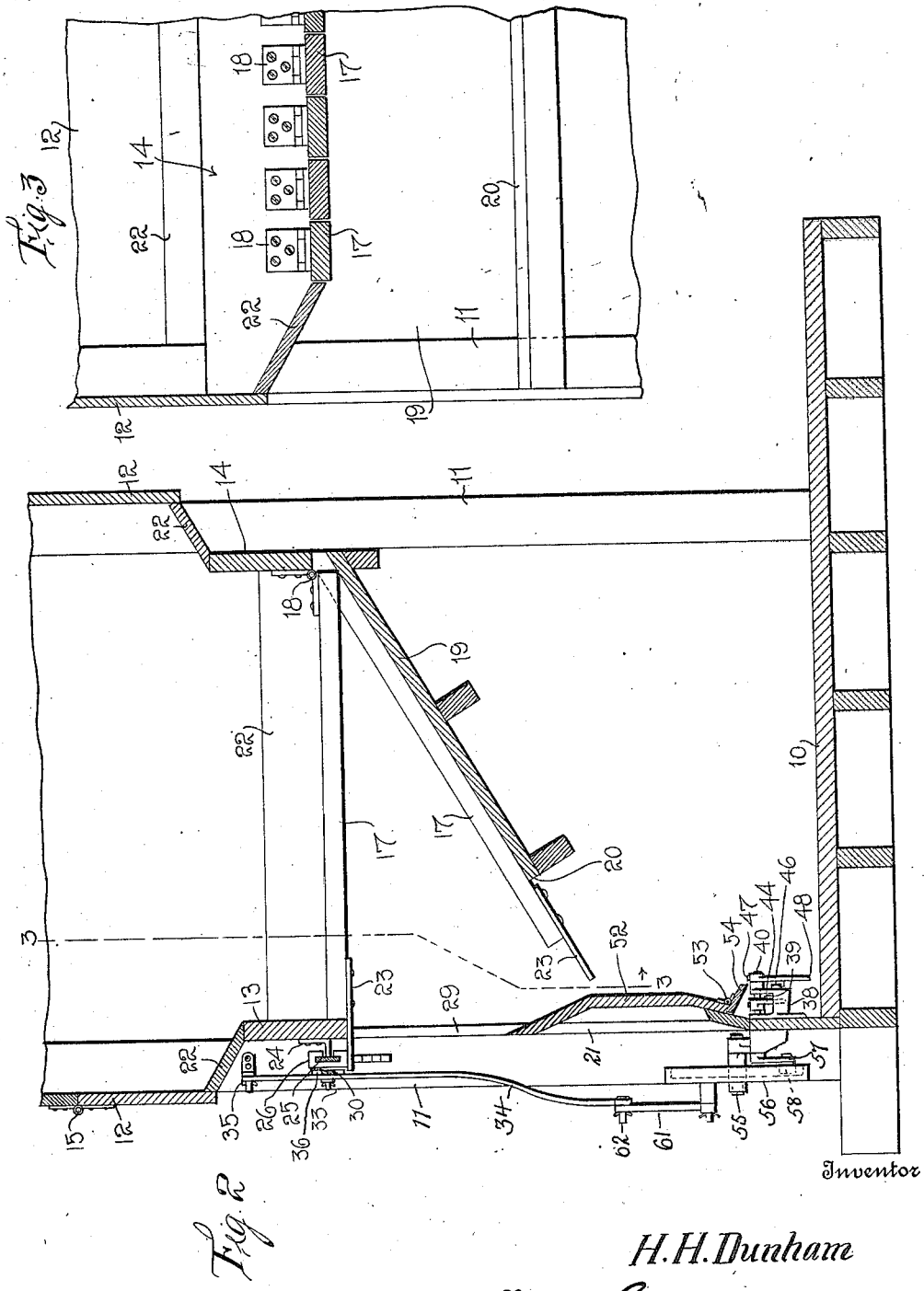

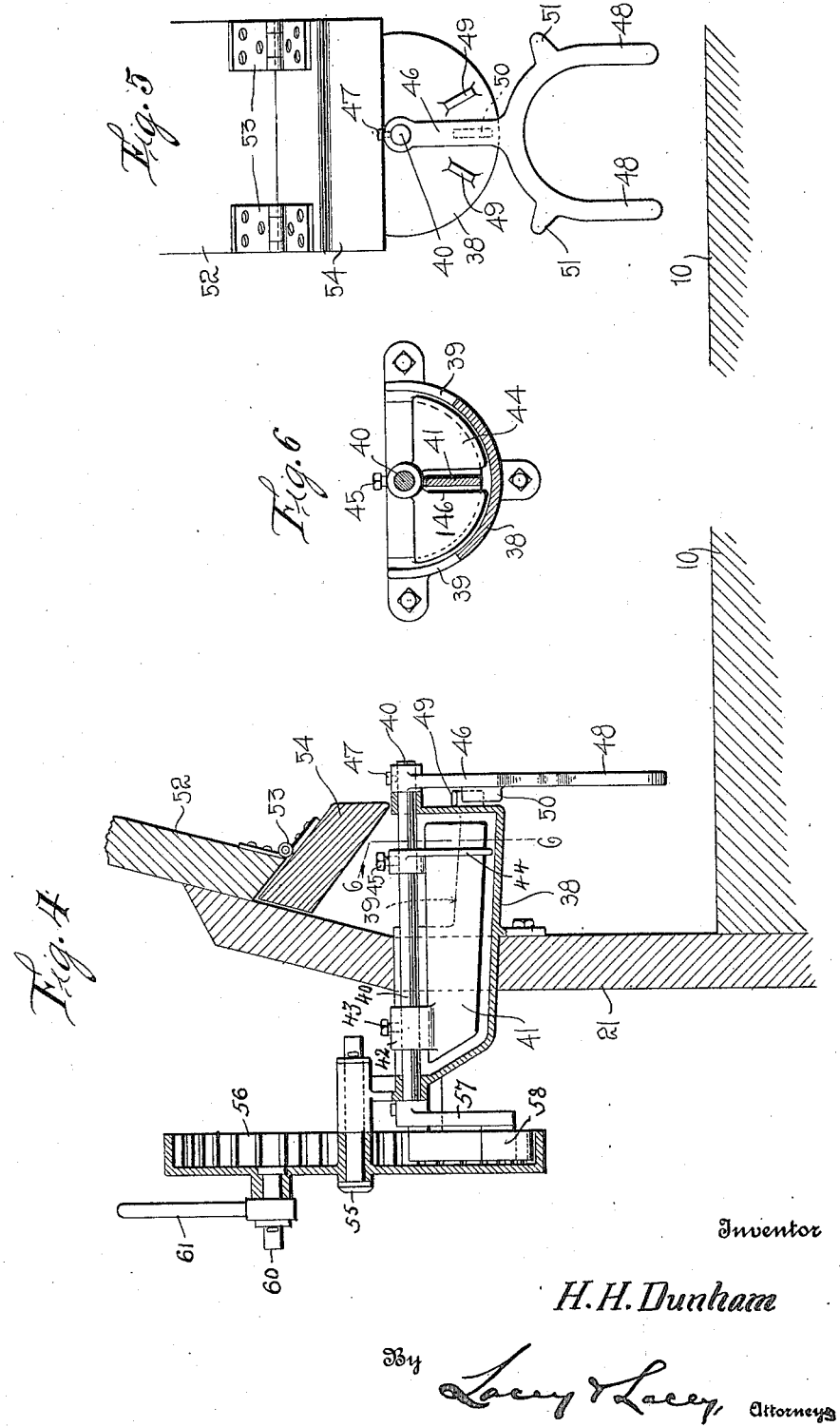

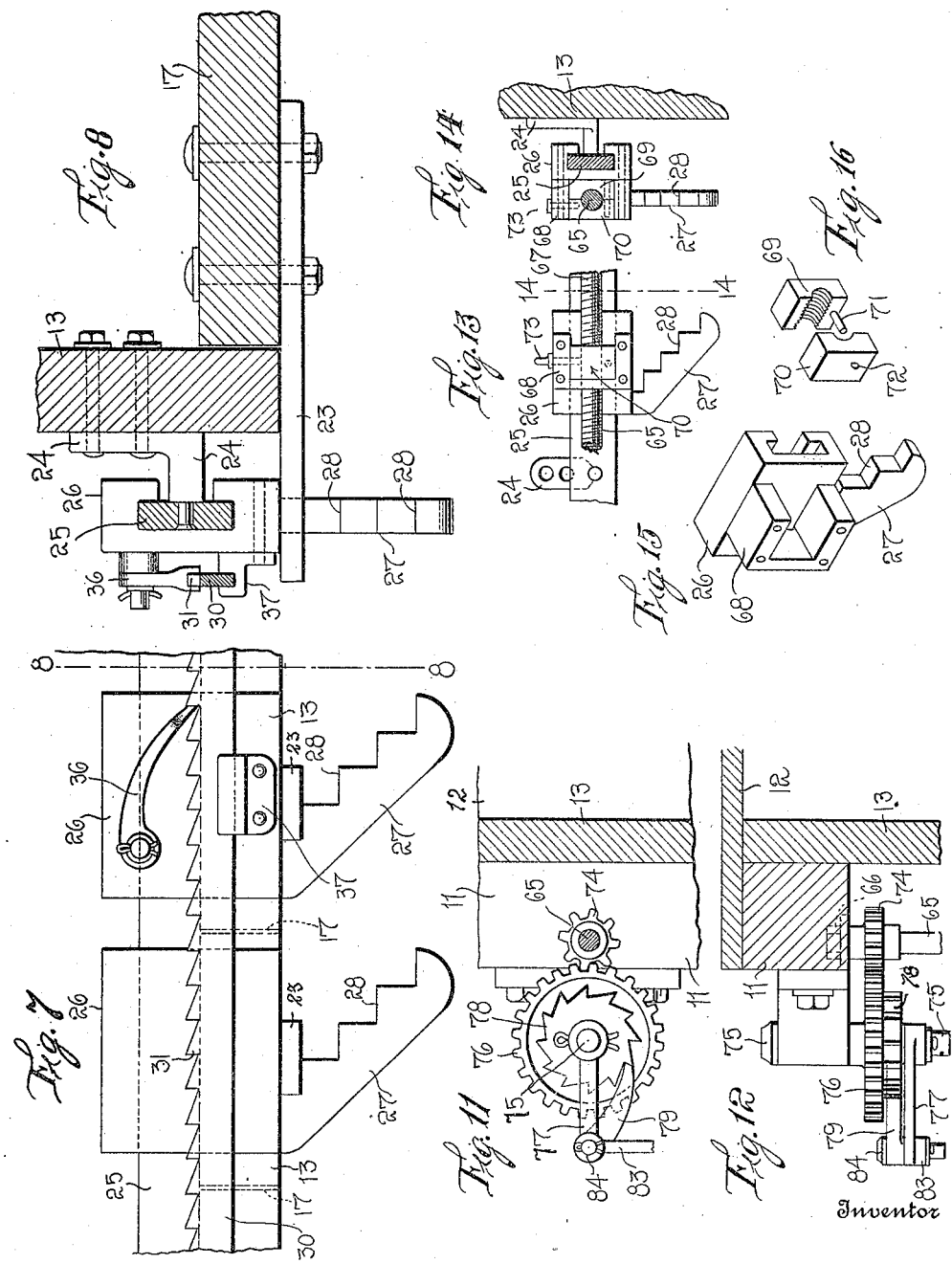

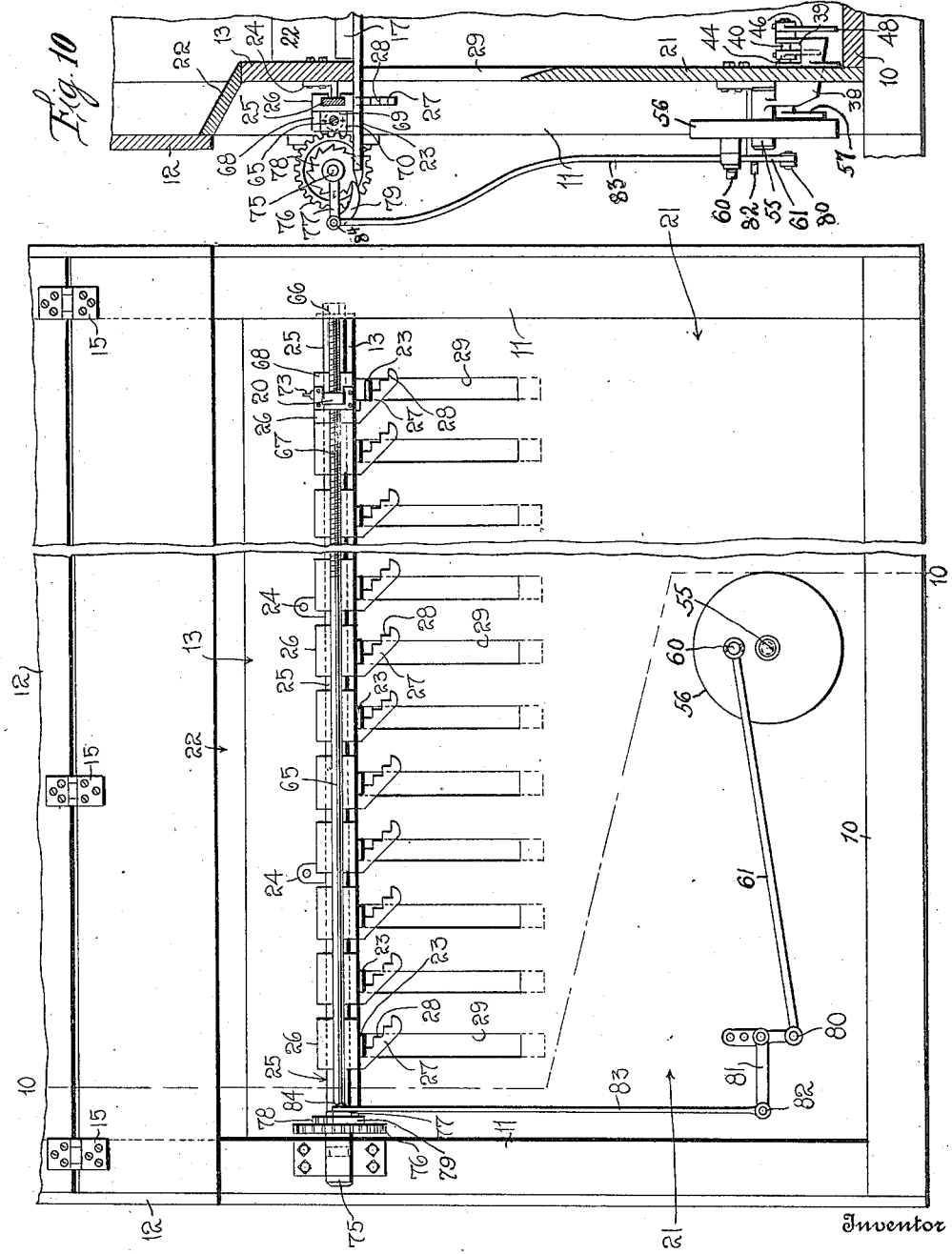

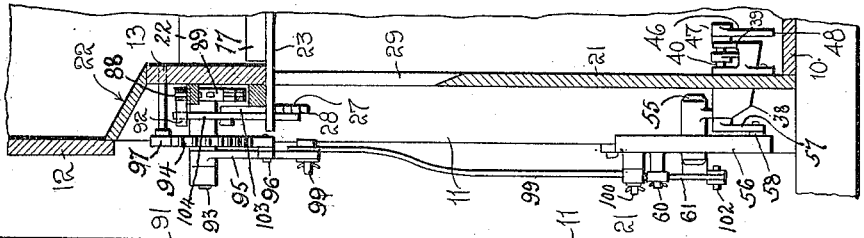

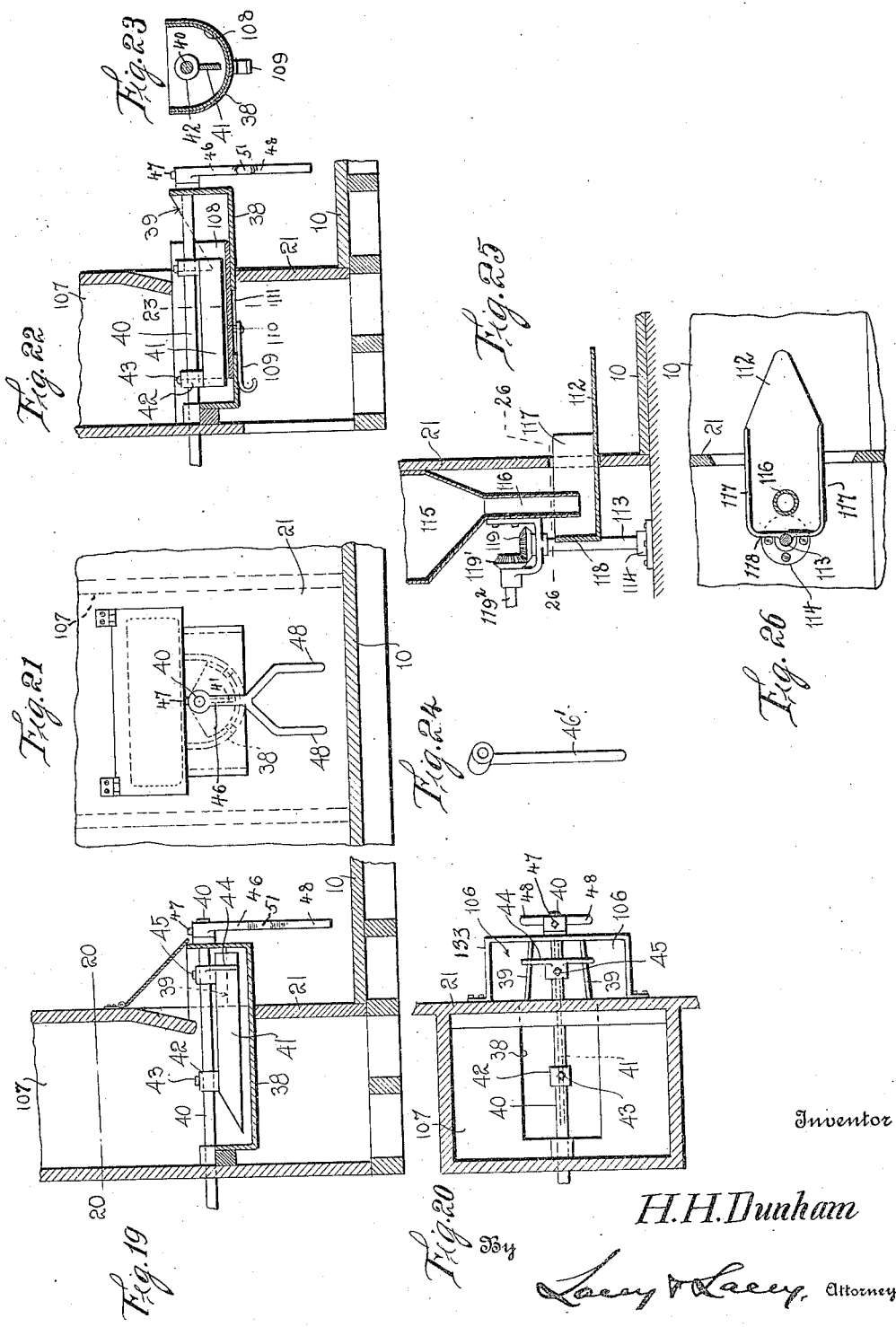

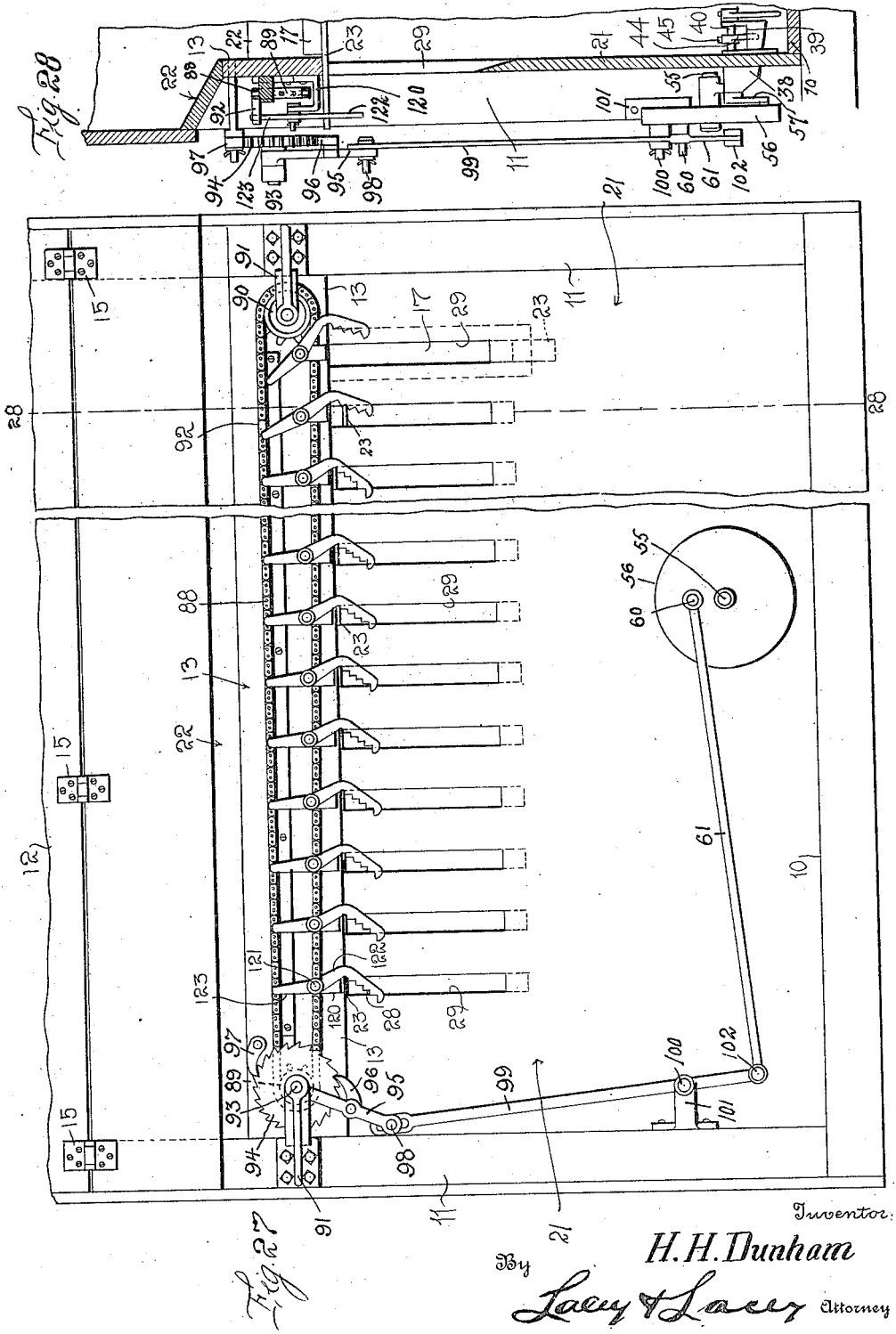

HARRY H. DUNHAM, OF NEW SALEM, ILLINOIS.

STOCK-FEEDER.

1,307,120.          Specification of Letters Patent.          Patented June 17, 1919.

Application filed March 26, 1918. Serial No. 224,878.

*To all whom it may concern:*

Be it known that I, HARRY H. DUNHAM, a citizen of the United States, residing at New Salem, in the county of Pike and State of Illinois, have invented certain new and useful Improvements in Stock-Feeders, of which the following is a specification.

This invention relates to stock feeders, and has for one of its objects to provide an apparatus of this character in which provision is made for supplying the feed to the stock consecutively in relatively small quantities, or only as fast as it is consumed, to avoid waste, and in which means are provided whereby the efforts of the animals to secure an additional supply of feed causes feed releasing devices to be actuated to supply an additional amount of feed.

Another object of the invention is to provide a device of this character including means whereby a restricted quantity of feed is supplied to the animals and a "bait" holding device releasable by the efforts of the animals to reach the feed and connected to the feed releasing mechanism, so that the movement of the bait discharging mechanism operates the feed releasing mechanism.

With these and other objects in view, the invention consists in certain novel features of construction, as hereinafter shown and described and then specifically pointed out in the claims; and in the drawings illustrative of the preferred embodiment of the invention—

Figure 1 is an elevation from the rear side.

Fig. 2 is a transverse section.

Fig. 3 is a longitudinal section of a portion of the apparatus on the line 3—3 of Fig. 2.

Fig. 4 is an enlarged longitudinal section of the combined bait holder and distributer and the device whereby the animals are caused to operate the floor releasing mechanism.

Fig. 5 is an elevation of the parts shown in Fig. 4.

Fig. 6 is a transverse section on the line 6—6 of Fig. 4.

Fig. 7 is an enlarged detail view illustrating the construction and operation of a portion of the floor releasing mechanism.

Fig. 8 is an edge view of the parts shown in Fig. 7 with portions in section on the line 8—8 of Fig. 7.

Fig. 9 is a view similar to Fig. 1, illustrating a modification in the construction.

Fig. 10 is a section on the line 10—10 of Fig. 9.

Fig. 11 is an enlarged sectional detail of a portion of the modified mechanism shown in Figs. 9 and 10.

Fig. 12 is a plan view of the parts shown in Fig. 11.

Fig. 13 is an enlarged detail of another portion of the modified mechanism shown in Figs. 9 and 10.

Fig. 14 is a section on the line 14—14 of Fig. 13.

Fig. 15 is a perspective view of the modified form of a portion of the floor releasing device illustrated in Figs. 9 and 10, 13 and 14.

Fig. 16 represents the construction of the separable nut employed in the modified structure shown in Figs. 13—14 and 15.

Fig. 17 is a view similar to Figs. 1 and 9 illustrating another modification in the construction.

Fig. 18 is a section on the line 18—18 of Fig. 17.

Fig. 19 is a view similar to Fig. 4, illustrating a modification in the construction of the bait feeding mechanism.

Fig. 20 is a plan view partly in section on the line 20—20 of Fig. 19.

Fig. 21 is an elevation of the parts shown in Fig. 19.

Fig. 22 is a view similar to Fig. 4, illustrating another modification in the construction of the bait feeding mechanism.

Fig. 23 is a section on the line 23—23 of Fig. 22.

Fig. 24 is a detached perspective view of a modified form of the bait feed operating lever.

Fig. 25 is a view similar to Fig. 4, illustrating another modification in the construction of the bait feeding mechanism.

Fig. 26 is a plan view partly in section on the line 26—26 of Fig. 25.

Fig. 27 is a view similar to Figs. 1, 9, and 17, illustrating another modification in the construction.

Fig. 28 is a section on the line 28—28 of Fig. 27.

Fig. 29 is a detail of the form of floor section holding means employed in the modified structure shown in Figs. 17 and 18.

The invention as illustrated in the accompanying drawings includes a floor 10 upon which the feed is deposited and above which the receptacle for the supply of the feed is located. The receptacle is supported by posts 11 and includes inclosing sides 12 and main longitudinal side members 13—14, the latter members being preferably attached to the confronting faces of the posts 11. The members 13—14 are spaced a considerable distance above the floor 10, and one side 12 of the receptacle is hingedly connected as shown at 15 to enable it to be moved outwardly to permit the insertion of the stock of feed. The feed employed may be of any required compound, or corn on the cob, as preferred.

The receptacle preferably opens downwardly or toward the floor 10, and its bottom is formed of relatively narrow sections 17, each section being hingedly united at 18 to the member 14 and normally bearing at its opposite end against the inner face of the member 13, as illustrated in Fig. 2, whereby to close the lower end of the receptacle. Disposed within the space beneath the members 13—14 is an inclined supporting member 19 with its inner edge 20 spaced from the wall 21 which occupies the space between the member 13 and the floor 10. For the purpose of this description, the side of the apparatus which contains the wall members 13 and 21 will be referred to as the rear, while the opposite side will be referred to as the front of the apparatus. The space between the edge 20 and the wall 21 will form the passage for the feed delivered from the receptacle.

The member 19 constitutes a stop to limit the downward movement of the sections 17, and also as a protector for the animals while feeding to prevent the released feed from falling upon them. By this arrangement it will be obvious that when the floor sections 17 are released the portions of the feed held back thereby will fall upon the floor 10 through the space between the depressed sections 17 and the wall 21 in convenient position for the animals.

The spaces between the sides 12 of the receptacle and the members 13—14 will preferably be inclined as represented at 22, so that all of the feed will be conducted to the space between the members 13—14 and will rest upon the floor sections 17. Each floor section is provided with a holding member or latch 23 which extends rearwardly of the member 13 as shown more particularly in Figs. 2, 8 and 10.

Attached to the rear face of the member 13 by brackets 24 is a supporting track 25, the ends of said track being preferably supported in the adjacent posts 11. The brackets 24 are arranged at suitable intervals to provide a sufficient support for the track, while at the same time leaving the upper and lower edges and the outer face of the same unobstructed from end to end.

Slidably disposed upon the track are a plurality of holding devices or keepers for the latches or tongues 23 of the floor sections. Any desired number of the floor sections 17 may be employed, and they may be of any desired width. When the apparatus is arranged to hold corn on the cob as a feed, the floor sections will be about 6 inches wide, and about 5 feet long, but these dimensions may be varied as required to adapt the apparatus to the kind of feed employed. For the purpose of illustration, sixteen of the floor sections are shown, and an equal number of the holding devices will be slidably disposed upon the track 25. Each holding device comprises a head 26 slidably disposed upon the track with an opening at the rear to enable it to pass over the lower portion of the bracket 24 as illustrated more clearly in Figs. 2, 8 and 14. Depending from each head 26 is an obliquely directed arm 27 having a plurality of step-like supports or notches 28. The steps 28 are designed to receive the latches or tongues 23 of the floor sections, to support the latter in their upper position or to partially release the floor sections by causing the latches 23 to engage the steps consecutively, as hereafter explained. The wall 21 of the receptacle is provided with vertical slots or recesses 29, one in vertical alinement with each latch and through which the latter projects when in upper position. The openings 29 thus serve as guideways for the free ends of the latches and prevent lateral displacement of the same and the floor sections 17 to which they are attached.

Before the supply of feed is deposited in the receptacle, the floor sections are manually arranged in closed position with the latch of each floor section engaged with the upper step 28 of an arm 27, as illustrated in Figs. 1, 2, 7, 8, 9, and 10. Means are provided for causing the heads 26, together with their arms 27, to be consecutively moved along the track 25 to correspondingly release the floor sections successively. In Figs. 1, 2, 7 and 8 is shown one means for accomplishing the desired result. Initially the heads 26, when arranged with the upper steps 28 engaged with the respectively adjacent latches, will be in spaced relation upon the track as shown at the left in Figs. 1, 7 and 9. Disposed in parallel relation to the track, and likewise spaced therefrom, is an operating bar 30, provided with a plurality of ratchet teeth 31 at one end and slidably supported as, represented at 32, at the ratcheted end. At its opposite end, the bar 30 is pivoted at 33 to a lever 34, the latter pivoted at its upper end 35 to the frame-work of the apparatus. By this arrangement when the lever 34 is actuated the bar 30 will be moved back and forth in its support 32. The head 26 adjacent the support 32 is provided with a pawl 36 engaging the ratchet teeth 31 as illustrated in Figs. 1, 7, and 8, and said head is also provided with a guide device 37 which engages the bar 30 and holds it in operative relation to the pawl 36. By this arrangement, when the lever 34 is vibrated the bar 30 will be correspondingly vibrated and cause the ratchet teeth 31 to engage the pawl 36 and thus move the head to which the pawl is attached toward the next head, and when the movement of the pawl carrying head is continued it picks up the next head and carries it toward the third head, and so on as long as the bar 30 is actuated by the movement of the lever 34. By this means the heads are consecutively moved longitudinally of the track.

The ratcheted portion 31 of the bar 30 will be of sufficient length to cause all of the heads to be moved longitudinally of the track until the terminal head next to the lever 34 is moved the requisite distance to cause the release of the last latch 23 and the floor section connected thereto. In Fig. 1, the apparatus is shown with five of the heads in close relation or in contact edge to edge, thus indicating that four of the heads have been "picked up" by the action of the head which carries the pawl 36, while the remaining heads are still in spaced relation upon the track.

At the first movement of the pawl carrying head the latch 23 which is supported thereby will be released and dropped to the second step 28, thus partially releasing the floor section 17 which is connected therewith. At the next movement of the bar 30, the head will be moved farther along the track and cause the latch 23 to drop to the third step, and so on until the head has been moved to a sufficient extent to entirely release the latch 23 and the floor section connected therewith, which will then drop into engagement with the member 19, as illustrated in Fig. 2, and release the quantity of feed supported by the released section and permit it to fall to the floor 10. When the latches are thus released step by step the floor sections will be correspondingly released for a short distance at a time, and thus gradually release the feed. As the movement of the lever 34 continues, the heads will be "picked up" consecutively as above described and the floor sections successively released. By this means the feed is released in small quantities only or just so fast as it is consumed by the animals, thus avoiding waste. When the final head has been actuated, the crib or receptacle will have been emptied of its supply of feed. The floor sections are then manually elevated and connected with their respective supporting members, and the receptacle or crib again supplied with a stock of the feed.

Means are provided in the improved apparatus for causing the animals to actuate the movable section releasing devices by their efforts to obtain a supply of the feed, the animal actuated means being connected with the lever 34. The device which is adapted to be actuated by the animal comprises a feed receiving trough 38 supported through the lower portion of the rear wall 21 of the apparatus, as illustrated more clearly in Fig. 4. A portion of the trough 38 is thus accessible rearwardly of the wall 21, while the remaining portion is within the feeding space for the animals. The trough 38 is inclined at the lower side so that the feed will naturally flow toward the front end, and is formed with relatively large openings 39 at the sides of the front larger end. Mounted for oscillation in the upper portion of the trough 38 is a shaft 40, and supported upon the shaft is a longitudinally directed agitator member or plate 41 spaced at its lower edge from the bottom of the trough. The agitator 41 is provided with a sleeve 42 slidably disposed upon the shaft 40 and adapted to be locked to the shaft by a set screw 43, the agitator being thus coupled to the shaft 40 to rotate therewith but being adjustable thereon longitudinally. Slidably disposed upon the shaft 40 opposite the openings 39 is a transverse gage plate 44 secured to the shaft 40 in any adjusted position by a set screw 45. The gage 44 is provided with a central open slot 146 through which the agitator 41 projects as illustrated in Fig. 6. The gage 44 is thus adjustable longitudinally of the trough 38 and forms a transverse guard or stop to control the flow of the material deposited in the trough, the latter forming a receptacle for a supply of fine feed which serves as "bait" to the animals. Attached to the front end of the shaft 40 is a depending arm 46, the arm being locked to the shaft by a set screw 47. At its lower end the arm 46 is divided or forked to provide spaced portions 48, projecting at their lower ends to a point a short distance from the floor 10, as illustrated more particularly in Figs. 4 and 5. The trough 38 is provided on its front end with stops 49 in spaced relation and the arm 46 is provided with a single stop 50 extending into the space between the stops 49. By this means the arm 46 with its forked terminals 48 is free to move laterally and cause the shaft 40 to be oscillated, its lateral movement being limited by the coaction of the stops 49—50. The forked portions 48 are provided respectively with projections 51. The portion of the wall 21 immediately above the trough 38 is projected inwardly, or toward the feeding side as illustrated at 52, to form a protector or guard to prevent the feed, supported by the movable floor sections 17 which are in vertical alinement with the bait trough, from engaging the trough when it falls. Hingedly connected at 53 to the portion 52 of the wall 21 is a guard plate 54 which protects the contents of the trough from the animals while feeding, but which may be elevated out of the way when the gage 44 is to be adjusted. It will thus be obvious that when the arm 46 and its spaced portions 48 are actuated, the agitator 41 will be correspondingly vibrated and cause a portion of the feed which may be deposited within the trough to be projected through the openings 39 and so to the floor 10. By adjusting the gage the quantity of the feed which may be discharged at each movement of the arm 46 will be controlled, and the supply increased or decreased to any required extent within the range of movement of the gage.

Mounted for rotation upon a stub shaft 55 adjacent or attached to the trough 38 in advance of its smaller end is a ratchet disk 56, preferably with internal teeth, and extending from the shaft 40 is an arm 57 carrying a pawl 58 engaging the teeth of the ratchet. A backing pawl, indicated at 59, is arranged to engage the ratchet teeth to prevent retrograde movement of the disk. Pivoted at 60 to the disk 56 is one end of a rod 61, the opposite end of which is pivoted at 62 to the lever 34.

By this arrangement when the arm 46 is vibrated by the animal in his efforts to get at the feed in the trough 38, the shaft 40 will be oscillated and transmit rotary motion to the disk 56 and vibratory movement to the lever 34 and thus correspondingly actuate the toothed bar 30, as before described.

The range of movement of the bar 30 is relatively short and several movements of the arm 46 are required to release one of the sections 17, so that the feed will be dropped from the receptacle at relatively long intervals, depending largely upon the activity of the animals in operating the bait mechanism. Thus waste is effectually prevented.

After the crib or receptacle has been charged with its supply or feed with the movable sections 17 in their elevated or closed position, as before described, the trough 38 will likewise be supplied with a quantity of suitably fine feed, or feed sufficiently fine to be fed from the trough by the movement of the agitator. Initially a small quantity of feed may be deposited upon the floor 10 beneath the trough 38 to attract the animals, and as this small quantity is consumed, the animals, in their efforts to obtain more of the feed, will naturally come in contact with the portions 48 of the arm 46, vibrating the latter and causing additional feed to be discharged through the openings 39. This movement of the arm 46, as before described, will cause the operation of the lever 34 and the corresponding operation of the movable section releasing devices. When the animals have vibrated the arm 46 to a sufficient extent to cause the release of the first movable section 17 the larger quantity of feed thus released will attract the animals and cause them to consume the latter, and when this released quantity of feed is fully consumed the animals will naturally attempt to increase the supply by again engaging the arm 46, with the result of actuating the section releasing mechanism, and so on continually until the bin or receptacle is empty. Thus the device is self-actuating, and will supply the feed only so fast as it is consumed.

The pawl 36 will run idle after the last head has been actuated, as the pawl will then have passed the ratcheted portion of the rod 30 so that the continued operation of the bait devices will not produce any effect on the section-releasing devices.

In Figs. 9 to 16 is shown a modified mechanism for causing the operation of the section releasing devices in which I substitute for the rod 30 a rod 65 mounted for oscillation or rocking movement at its ends as illustrated at 66. The rod 65 is threaded for a distance as illustrated at 67, the threads performing the same function as the ratchet teeth 31 in the structure shown in Fig. 1. Attached to the terminal head 26 which corresponds to the pawl bearing head of the structure shown in Fig. 1, is a casing 68 through which the threaded portion 67 of the rod is slidably engaged.

Disposed within the casing 68 is a divided nut 69—70, the coacting parts of the nut being held from movement one upon the other by a pin 71 projecting from one of the nut members and engaging in an aperture 72 in the other nut member. The nut members 69—70 may thus be coupled to the threaded portion 67 of the rod 65 within the casing 68 and held from turning on the rod by the walls of the casing. One of the nut members is further coupled to the casing by a detachable pin 73. By this arrangement the head 26 to which the casing 68 is attached is coupled to the threaded portion of the rod, and when the latter is rotated the casing carrying head will be moved longitudinally of the track 25 by the coaction of the divided nut 69—70 and the threaded rod 65 in the same manner as the corresponding head is moved upon the track in the structure shown in Fig. 1.

The coacting nut members may be readily detached, to enable the releasing mechanism to be reset when the crib is empty. Connected to the rod 65 at the end remote from the threaded portion is a pinion 74, and mounted upon a stub shaft 75 is a gear wheel 76 engaging the pinion. Mounted upon the shaft 75 is a lever arm 77, and connected to the shaft 75 or to the gear 76 is a ratchet wheel 78 with which a pawl 79 carried by the arm 77 engages as shown in Fig. 11. In the modified structure the rod 61 is pivoted at 80 to a bell crank lever 81, and pivoted at 82 to the longer arm of the bell crank is a rod 83, the latter being pivoted at its upper end at 84 to the lever arm 77. By this arrangement when the shaft 40 is vibrated by the action of the animals in their efforts to obtain the feed from the trough 38 the motion of the shaft 40 will be communicated to the bell crank lever 81 and thence through the rod 83 to the arm 77, and effect a step by step movement of the ratchet 78, which movement will be communicated through the gear 76 and the pinion 74 to the rod 65, and cause the latter to move the heads 26 consecutively longitudinally of the track in the same manner and producing the same results as previously described in connection with the mechanism illustrated in Fig. 1.

When the screw action, illustrated in Figs. 9 and 10, is employed, the nut members 69—70 will have run off from the threaded portion of the rod 65 by the time the last head has been actuated and will thereafter run idle.

In Figs. 17 and 18 is shown a modified arrangement for releasing the floor sections 17. In this modified structure an endless chain 88 is employed for actuating the floor releasing devices, and is arranged to travel over chain wheels 89—90 supported respectively by brackets 91 connected to the adjacent posts 11. One of the links of the chain is provided with a laterally projecting finger 92 as shown.

The shaft 93 of the chain wheel 89 is extended to support a ratchet wheel 94 and a lever arm 95, the latter having a pawl 96 to engage the teeth of the ratchet 94. A backing pawl 97 will also be employed to prevent retrograde movement of the ratchet wheel. Pivoted at 98 to the arm 95 is a relatively long operating lever 99, the latter pivoted at 100 to a bracket 101 connected to the adjacent post 11. The rod 61 is pivoted at 102 to the lever 99 at its lower end. By this arrangement when the shaft 40 is vibrated by the efforts of the animals to secure additional supply of material, the oscillating movement of the shaft will be communicated to the chain 88 and cause a step by step movement of the latter.

Connected to the wall 13 at uniformly spaced intervals are brackets corresponding in number to the floor sections 17. Each of the brackets 103 is provided with one of the depending arms 27 having the steps 28 substantially in the same form as illustrated in Fig. 7. The brackets 103 correspond to the heads in the structure shown in Fig. 1, except that they are stationary instead of being movable. The latches 23 of the floor sections 17 extend into position to be engaged by the steps 28 in the same manner as heretofore described and as shown in Fig. 1.

When the modified structure shown in Figs. 17 and 18 is employed the latches 23 will be pivoted as shown at 94' in Fig. 29, and will be moved laterally by the action of shifting levers 104, one being pivoted at 105 to each of the brackets 103. The lower arm of each shifting lever extends past the adjacent latch 23 while the upper arm of the lever extends to a point slightly above the upper run of the chain 88, and into the path of the lateral projection 92. By this arrangement when the levers 104 are moved in one direction they will correspondingly move the latches and release them from engagement with the steps 28, and cause the floor sections to fall, as before described. Initially the levers 104 will be arranged as shown at the left in Fig. 17 and inactive relative to the latches. Then when the chain 88 is operated the lateral projection 92 will engage the upper ends of the levers successively and cause the release of the floor sections consecutively. At the right of Fig. 17 the chain has progressed far enough to complete the action of the projection 92 upon the first lever, entirely releasing the floor section associated therewith, and partially release the second lever, or to cause the latch associated therewith to fall upon one of the intermediate steps 28, and thus partially release the floor section to which it is connected. Then as the movement of the chain continues the projection 92 will engage the upper portions of the several shifter levers successively and operate them and pass over them and consecutively release the floor sections. In the modified structure the openings 29 for the passage of the latches will necessarily be of greater width than shown in Figs. 1 and 9 inasmuch as the latches in the arrangement just described move laterally as well as vertically.

In Figs. 19, 20, and 21 is shown a modified construction of the bait device. In this modified structure the portion of the trough 38 which extends through the wall 21 is enlarged laterally to form a guard 133 for the trough which is open at the lower side to form spaces indicated at 106 through which the bait material falls when fed by the agitator 41 through the side openings.

The guard 133 protects the discharge end of the trough 38 and prevents the noses of the animals from coming in contact with the same or with the agitator. In this modified structure a receptacle for the supply of bait material is employed and illustrated at 107. This receptacle may be of any required size to hold any required amount of the bait material.

In Figs. 22 and 23 as illustrated another modified structure of the bait device consisting in a valve plate or lining 108 within the trough 38, conforming in outline to the inner face of the trough, and adjustable longitudinally therein. In the modified structure the openings 39 are gradually and uniformly reduced toward the discharge end of the trough as shown in Fig. 22. The adjustable valve plate 108 is of less length than the trough 38 but of such height that when moved toward the discharge end of the trough, it completely closes the openings 39, and when moved in the opposite direction uncovers the openings to an extent corresponding to the location of the member 108. By this means it will be obvious that the openings 39 may be closed to a greater or less extent by adjusting the member 108 longitudinally of the trough. Thus the openings 39 may be readily adjusted to correspond to the kind of material placed therein.

Means are employed for adjusting the valve 108 within the trough, consisting in a pull rod or handle 109 connected to the valve by a rivet or like device 110 operating in a longitudinally directed slot 111 in the bottom of the trough 38. It will be obvious that by operating the rod 109 the valve may be adjusted to any required extent within the range of the slot 111.

In Figs. 25 and 26 another modification of the bait mechanism is shown consisting in a flat plate or tray 112 extending through an opening in the wall 21 and attached to a vertical shaft 113, the latter stepped at its lower end as shown at 114 upon the floor 10. By this means it will be obvious that when the tray 112 is oscillated the shaft 113 will be correspondingly oscillated or vibrated. Supported above the tray and against the outer face of the wall 21 is a storage bin 115 for the supply of bait feed or material. Leading from the bin 115 is a spout 116 terminating just above the vibrating tray 112 so that the feed from the bin will be conducted to the tray. The tray 112 is provided with vertically directed sides 117 and a vertical rear portion 118, to hold the material which falls from the spout and prevent it from escaping until it passes to the portion of the tray which extends into the feeding space. Thus the animals in their efforts to increase the supply of bait material will vibrate the tray 112 in the same manner as when the trough 38 and arm 46 are employed as heretofore described. Connected to the vertical shaft 113 at its upper end is a bevel gear 119 engaging with a corresponding bevel gear 119' on a stub shaft $119^2$, which corresponds to the shaft 55 and is to be coupled to the floor section releasing device in the manner shown in Figs. 1, 2, 9, 10, 17 and 18.

In Fig. 24 is illustrated a modified form of the vibrating lever 46 wherein the forked portions 48 are dispensed with and the lever continued as a single rod 46'. This form may be employed if preferred.

In Figs. 27 and 28 is shown another modification of the mechanism for actuating the floor releasing devices. In this structure the endless chain 88 is employed as shown in Figs. 17 and 18 and supported in the same manner and actuated by the same arrangement of mechanism from the shaft 40, and in the drawings the same reference characters are employed for the corresponding parts shown in Figs. 17 and 18. In the modified structure a plurality of brackets 120 are attached to the wall member 13, and correspond in number to the floor sections 17. Pivoted at 121 to each of the brackets 120 is an arm or lever 122 provided with the steps 28 in the same manner as shown in Fig. 1, the steps coacting with the latches 23 in the same manner as shown in Fig. 1, except that they are located upon the opposite sides of the latches from that shown in Fig. 1. Each of the shifter arms or levers 122 is extended upwardly as shown at 123 into the path of the lateral projection 92 of the chain in the same manner as the portions 104 of the shifter levers shown in Figs. 17 and 18. By this arrangement it will be obvious that as the chain is actuated the projection 92 will engage and pass over the portions 123 of the arms 122 successively and consecutively release the floor sections.

Having thus described the invention, what I claim as new is:

1. A stock feeder comprising a receptacle, a plurality of sections closing one side of the receptacle and supporting feed therein, and means for imparting a step by step opening movement to each of said sections successively.

2. A stock feeder comprising a receptacle, a plurality of sections closing one side of the receptacle and supporting feed therein, means for normally holding said sections in closed position, and means operatively connected with said holding means to intermittently actuate the holding means whereby to release each section with a step by step movement and successively release all the sections.

3. A stock feeder comprising a receptacle, a swinging closure for one side of said receptacle, a latch projecting from one end of said closure, a stepped support engaging said latch to support the closure, and means for moving said support whereby the latch will successively engage the several steps thereof to effect opening of the closure.

4. A stock feeder comprising a receptacle, a closure for said receptacle mounted at one end for swinging movement whereby to release the contents of the receptacle, a series of steps to support the free end of the closure, and means for moving said steps successively into engagement with the closure whereby a retarded discharge from the receptacle will be effected.

5. A stock feeder comprising a receptacle, a plurality of movable sections closing one side of the receptacle and supporting feed therein, a stepped support for each of said sections, and means for successively moving the said supports intermittently whereby to release each section gradually and consecutively release all the sections.

6. A stock feeder comprising a frame, a receptacle supported by the upper portion of the frame, the rear wall of the receptacle extending to the bottom of the frame and the front wall of the receptacle terminating above the bottom of the frame, a feed holder mounted at the rear of the frame and below the receptacle, a swinging closure for the bottom of the receptacle, means associated with said feed holder for releasing said closure, and a partition extending downwardly and rearwardly from the front wall of the receptacle and terminating near said holder.

7. A stock feeder comprising a receptacle, a movable feed support forming one side of the receptacle, a feed holder mounted through a wall of the receptacle below the movable feed support, means associated with said holder and operatively connected with the movable feed support whereby feeding animals at the holder will release the feed support, and a deflector on the wall of the receptacle above the holder and extending over the same to prevent feed discharged from the receptacle entering the holder.

8. A stock feeder comprising a receptacle, a plurality of movable sections closing one side of the receptacle and supporting feed therein, a plurality of folding devices coacting each with one of said sections whereby to normally hold the sections in closed position, and means acting upon one of said holding devices to move the same out of engagement with the respective sections and toward the remaining holding devices and against the adjacent holding devices whereby to successively push all the remaining holding devices out of engagement with the respective sections.

9. A stock feeder comprising a receptacle with one of its walls formed of movable sections, means for releasing said sections one at a time, a feed holder, movable means associated with said holder for discharging a portion of the feed therefrom, and connecting means between the said holder movable means and the section releasing means.

10. A stock feeder including a receptacle for the feed having one of its walls of movable sections, a holding device for each of said sections, a feed holder, movable means associated with said holder for discharging a portion of the feed therefrom, and connecting means between the said holder movable means and the section holding devices.

11. In a stock feeder, a receptacle having movable sections for supporting the feed, a guide member, a plurality of holding devices slidable on said guide member and respectively supporting said sections, and means for consecutively actuating said holding devices to consecutively release said sections.

12. In a stock feeder, a receptacle having movable sections for supporting the feed, a guide member, a plurality of holding devices slidable on said guide member and respectively supporting said sections, a holder, movable means associated with said holder for discharging a portion of the feed therefrom, and connecting means between said holder movable means and the section holding devices.

13. In a stock feeder, a receptacle having movable sections for supporting the feed, a guide member, a plurality of holding devices slidable on said guide member and each including an arm formed with a plurality of steps to consecutively support one of the movable sections, and means for consecutively actuating said holding devices to consecutively release said sections.

14. In a stock feeder, a receptacle having movable sections for supporting the feed, a holding member extending from each of said sections, a guide member, a plurality of holding devices slidable on said guide member, and each including an arm formed with a plurality of steps to consecutively support one of said extended holding members, and means for consecutively actuating said holding devices to consecutively release said sections.

15. In a stock feeder, a receptacle having movable sections for supporting the feed, a guide member, a plurality of holding devices slidable on said guide member and respectively supporting said sections, a feed holder, movable means associated with said feed holder for discharging a portion of the feed therefrom, and connecting means between said holder movable means and said holding device operating means.

16. In a stock feeder, a receptacle having movable sections for supporting the feed, a guide member, a plurality of holding devices slidable on said guide member and respectively supporting said sections, a movable member with which one of the terminal holding devices is slidably engaged, means for coupling said terminal holding device to said movable member, and means for actuating said movable member to cause said coupled holding device to be moved thereon and consecutively move the remaining holding devices and effect the consecutive release of the sections.

In testimony whereof I affix my signature.

HARRY H. DUNHAM.

Copies of this patent may be obtained for five cents each, by addressing the "Commissioner of Patents, Washington, D. C."